United States Patent
Aldaz et al.

(10) Patent No.: US 9,113,287 B2
(45) Date of Patent: Aug. 18, 2015

(54) MOBILE BLUETOOTH DEVICE

(71) Applicant: Oticon A/S, Smørum (DK)

(72) Inventors: Gabriel Aldaz, Smørum (DK); Piotr Sapieżyński, Kgs. Lyngby (DK)

(73) Assignee: OTICON A/S, Smorum (DK)

( * ) Notice: Subject to any disclaimer, the term of this patent is extended or adjusted under 35 U.S.C. 154(b) by 166 days.

(21) Appl. No.: 13/714,199

(22) Filed: Dec. 13, 2012

(65) Prior Publication Data

US 2013/0157573 A1 Jun. 20, 2013

Related U.S. Application Data

(60) Provisional application No. 61/570,857, filed on Dec. 15, 2011.

(30) Foreign Application Priority Data

Dec. 15, 2011 (EP) .................................. 11193784

(51) Int. Cl.
*H04B 7/00* (2006.01)
*H04W 24/00* (2009.01)
*H04W 4/00* (2009.01)
(Continued)

(52) U.S. Cl.
CPC ............ *H04W 4/008* (2013.01); *H04M 1/6066* (2013.01); *H04M 1/7253* (2013.01); *H04M 1/72591* (2013.01); *H04R 25/554* (2013.01);
(Continued)

(58) Field of Classification Search
CPC ................. H04B 2201/71346; H04B 7/18556; H04B 7/18593; H04B 17/003; H04W 4/008; H04W 12/06; H04M 1/6066; H04M 1/7253; H04R 2225/55

USPC .............. 455/414.2, 456.1, 456.3, 41.2, 41.3, 455/522, 67.11, 66.1, 569.1
See application file for complete search history.

(56) References Cited

U.S. PATENT DOCUMENTS 7,778,432 B2 8/2010 Larsen
2003/0124979 A1* 7/2003 Tanada et al. ................... 455/41
(Continued)

FOREIGN PATENT DOCUMENTS

DE 10 2010 019 328 A1 12/2010
EP 1 759 457 A 3/2007
(Continued)

*Primary Examiner* — Andrew Wendell
(74) *Attorney, Agent, or Firm* — Birch, Stewart, Kolasch & Birch, LLP (57) ABSTRACT

A wireless communication system comprises a mobile Bluetooth device, first and second Bluetooth terminals, the mobile Bluetooth device comprising a memory and a controller performing a first pairing process with the first Bluetooth terminal as a result of which identical first link keys are stored in the mobile Bluetooth device and in the first Bluetooth terminal, the controller further performing a second pairing process with the second Bluetooth terminal such that identical second link keys are stored in the mobile Bluetooth device and in the second Bluetooth terminal. The controller stores in the memory a first location, a first vicinity and/or a first transmit power indication of the first Bluetooth terminal when performing the first pairing process and to store in the memory a second location, a second vicinity and/or a second transmit power indication of the second Bluetooth terminal when performing the second pairing process.

13 Claims, 4 Drawing Sheets

(51) Int. Cl.
*H04M 1/60* (2006.01)
*H04M 1/725* (2006.01)
*H04R 25/00* (2006.01)

(52) U.S. Cl.
CPC ........ *H04M 2250/02* (2013.01); *H04R 2225/55* (2013.01); *H04R 2225/61* (2013.01)

(56) References Cited

U.S. PATENT DOCUMENTS

| | | | |
|---|---|---|---|
| 2007/0071264 A1 | 3/2007 | Baechler et al. | |
| 2008/0032705 A1* | 2/2008 | Patel et al. | 455/456.1 |
| 2008/0040116 A1 | 2/2008 | Cronin et al. | |
| 2008/0101635 A1 | 5/2008 | Dijkstra et al. | |
| 2009/0073950 A1 | 3/2009 | Guccione et al. | |
| 2009/0076636 A1* | 3/2009 | Bradford et al. | 700/94 |
| 2009/0245551 A1 | 10/2009 | Nielsen | |
| 2010/0119093 A1 | 5/2010 | Uzuanis et al. | |
| 2011/0280403 A1* | 11/2011 | Deluca | 380/278 |
| 2012/0015605 A1 | 1/2012 | Sole | |
| 2012/0041982 A1* | 2/2012 | Jennings | 707/784 |
| 2013/0091288 A1* | 4/2013 | Shalunov et al. | 709/227 |
| 2014/0221042 A1* | 8/2014 | Masuda | 455/552.1 |

FOREIGN PATENT DOCUMENTS

| | | |
|---|---|---|
| EP | 1 981 253 A1 | 10/2008 |
| EP | 2 002 689 A | 12/2008 |
| EP | 2 060 149 A | 5/2009 |
| EP | 2073512 A1 | 6/2009 |
| EP | 2 076 065 A1 | 7/2009 |
| EP | 2 078 442 A | 7/2009 |
| EP | 2 107 825 A1 | 10/2009 |
| EP | 2 129 170 A1 | 12/2009 |
| EP | 2 200 207 A1 | 6/2010 |
| EP | 2 200 344 A2 | 6/2010 |
| WO | WO 2007/023192 A2 | 3/2007 |
| WO | WO 2008/052576 A1 | 5/2008 |

* cited by examiner

MOBILE BLUETOOTH DEVICE

CROSS REFERENCE TO RELATED APPLICATIONS

This nonprovisional application claims the benefit under 35 U.S.C. §119(e) of U.S. Provisional Application No. 61/570,857 filed on Dec. 15, 2011 and under 35 U.S.C. §119 (a) of patent application Ser. No. 11/193,784.3 filed in Europe on Dec. 15, 2011. The entire content of all of the above applications is hereby incorporated by reference.

TECHNICAL FIELD

The present invention is related to a mobile Bluetooth device adapted for engaging in a wireless Bluetooth connection to a first Bluetooth terminal disposed at a first location and to a second Bluetooth terminal disposed at second location spaced apart from the first location. The present invention is furthermore related to a corresponding method and to a computer program for operating a mobile Bluetooth device.

BACKGROUND ART

Bluetooth uses a method called bonding for recognising specific devices and thus enable control over which devices are allowed to connect to a given Bluetooth device and for allowing Bluetooth devices to be able to establish a connection without user intervention. A bond is created through a process called pairing. The pairing process is typically triggered by a specific request to create a bond from a user via a user interface.

Pairing typically involves some level of user interaction; this user interaction is the basis for confirming the identity of the devices. Once pairing successfully completes, a bond will have been formed between the two devices, enabling those two devices to connect to each other in the future without requiring the pairing process in order to confirm the identity of the devices. When desired, the bonding relationship can later be removed by the user.

During the pairing process, the two devices involved establish a relationship by creating a shared secret known as a link key. If a link key is stored by both devices they are said to be paired or bonded. A device that wants to communicate only with a bonded device can cryptographically authenticate the identity of the other device, and so be sure that it is the same device it previously paired with. Once a link key has been generated, an authenticated Asynchronous Connection-Less (ACL) link between the devices may be encrypted so that the data that they exchange over the airwaves is protected against eavesdropping.

Link keys can be deleted at any time by either device. If done by either device this will implicitly remove the bonding between the devices; so it is possible for one of the devices to have a link key stored but not be aware that it is no longer bonded to the device associated with the given link key.

(Note: The above description of the Bluetooth pairing process was adapted from an article on Wikipedia and underlies the same license conditions as the original article text.

Original article URL: http://en.wikipedia.org/wiki/Bluetooth

License URL: http://creativecommons.org/licenses/by-sa/3.0/)

Mobile Bluetooth devices such as smartphones, hearing devices, hearing aids or hearing-aid streamers (gateway devices for relaying audio signals between a hearing aid and an arbitrary source, for example disclosed in EP 1 981 253 A1) as well as Bluetooth terminals such as landline phone adapters or TV adapters are known from the prior art. Prior to establishing a secured communication connection between—for example—a hearing aid and a landline phone adapter, the devices require to be paired as described above.

US 2009/0073950 A1 discloses a Bluetooth-compatible headset that can pair up to at least seven wireless communication-enabled devices at once, two of which can be active simultaneously. The headset will automatically switch between two connected devices based on which device has requested an active audio channel. To disconnect the headset from a current audio-gateway device, the headset is either powered off or the pairing memory is cleared. When powered on, the headset will automatically reconnect to the last connected phone.

The disclosed automatic switching between connected devices may not always provide the connection the user desires, and if the user of the headset wants to switch to another device, the user is required to interact manually with the headset.

It is an object of the invention to provide an alternative Bluetooth device for engaging in a wireless Bluetooth connection and a corresponding method and computer program for operating a mobile Bluetooth device.

DISCLOSURE OF INVENTION

This and other objects of the invention are achieved by the invention defined in the accompanying independent claims and as explained in the following description. Further objects of the invention are achieved by the embodiments defined in the dependent claims and in the detailed description of the invention.

The present invention recognizes that with an ever increasing number of Bluetooth terminals a mobile Bluetooth device is to be connected to, users find themselves easily frustrated by lost connections and lost pairings. This is because the reconnection of a mobile Bluetooth device to one of a number of Bluetooth terminals in the vicinity results in long connecting times or even requires manoeuvring through Bluetooth setup lists manually. This is especially true when it is desired to connect the mobile Bluetooth device to only one of a number of available Bluetooth terminals. The present invention also recognizes that this is especially unfavourable when using a hearing aid or a hearing-aid streamer, since in this case the user (which may be of any age and technical skill) is very much dependent on a mobile Bluetooth device to connect fast and easy.

According to the present invention it is suggested to determine a spatial relationship between a mobile Bluetooth device and number of Bluetooth terminals to allow, through evaluation of the determined spatial relationship, for an automatic reconnection of the mobile Bluetooth device to one of the number of Bluetooth terminals. This allows reconnection without manual interaction by the user.

In the following, embodiments of the invention are described. Additional features explained in the context of different embodiments may be combined with each other to form further embodiments, as long as they are not explicitly described as forming mutually exclusive alternatives to each other.

In the present context, a "hearing device" refers to a device, such as e.g. a hearing aid, a listening device or an active ear-protection device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A "hearing device" further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve and/or to the auditory cortex of the user.

A hearing device may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing device may comprise a single unit or several units communicating electronically with each other.

More generally, a hearing device comprises an input transducer for receiving an acoustic signal from a user's surroundings and providing a corresponding input audio signal and/or a receiver for electronically receiving an input audio signal, a signal processing circuit for processing the input audio signal and an output means for providing an audible signal to the user in dependence on the processed audio signal. Some hearing devices may comprise multiple input transducers, e.g. for providing direction-dependent audio signal processing. In some hearing devices, the receiver may be a wireless receiver. In some hearing devices, the receiver may be e.g. an input amplifier for receiving a wired signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal in the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves and/or to the auditory cortex.

A "hearing system" refers to a system comprising one or two hearing devices, and a "binaural hearing system" refers to a system comprising one or two hearing devices and being adapted to cooperatively provide audible signals to both of the user's ears. Hearing systems or binaural hearing systems may further comprise "auxiliary devices", which communicate with the hearing devices and affect and/or benefit from the function of the hearing devices. Auxiliary devices may be e.g. remote controls, remote microphones, audio gateway devices, mobile phones, public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

MODE(S) FOR CARRYING OUT THE INVENTION

Figure 1:
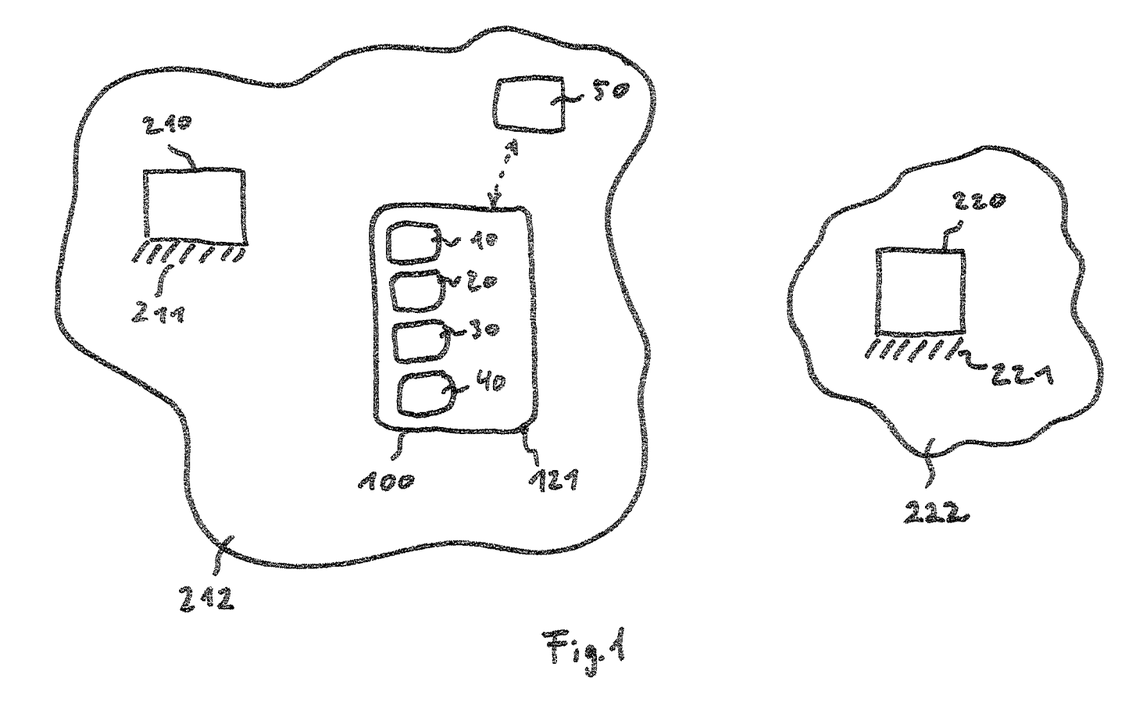
FIG. 1 schematically depicts an embodiment of a wireless communication system according to the invention, FIG. 2 schematically depicts a further embodiment of a wireless communication system according to the invention, FIG. 3 schematically depicts, by means of a flow chart, an embodiment of a method according to the invention, and FIG. 4 schematically depicts, by means of a flow chart, a further embodiment of a method according to the invention.

The wireless communication system depicted in FIG. 1 comprises a mobile Bluetooth device 100 located at a current device location 121 (more or less identical to the current location of a user wearing the mobile Bluetooth device 100), a first Bluetooth terminal 210 being stationary located at a first location 211 and a second Bluetooth terminal 220 being stationary located at a second location 221. The first Bluetooth terminal 210, which may be provided as a landline phone adapter at a user's workplace, is surrounded by a first vicinity 212. The first vicinity 212 is delimited by a set of coordinates defined by the limits of the workplace and is preferably chosen such that the mobile Bluetooth device 100 is within a Bluetooth communication range of the first Bluetooth terminal 210 when the mobile Bluetooth device 100 is within the first vicinity 212. The second Bluetooth terminal 220, which may be provided as a landline phone adapter at the user's home, is surrounded by a second vicinity 222. The second vicinity 222 is delimited by a set of coordinates defined by the limits of the home and is preferably chosen such that the mobile Bluetooth device 100 is within a Bluetooth communication range of the second Bluetooth terminal 220 when the mobile Bluetooth device 100 is within the second vicinity 222. The first vicinity 212 and the second vicinity 222 do not overlap. This may be because the distance between the first Bluetooth terminal 210 located at work and the second Bluetooth terminal 220 located at home is larger than the sum of the Bluetooth communication ranges of both Bluetooth terminals 210, 220.

In the present context, the term "vicinity" denotes an area (or volume) covered by a Bluetooth terminal. A vicinity may be delimited by a maximal Bluetooth range of a respective Bluetooth terminal, wherein a maximal Bluetooth range may be e.g. 100 m (Bluetooth class I, 20 dBm power), 10 m (Bluetooth class II, 4 dBm power) or 1 m (Bluetooth class III, 0 dBm power). A vicinity may also be delimited by a set of coordinates, e.g. coordinates defined by the limits of a ground plan or property. A vicinity may be stored in a memory of a mobile Bluetooth terminal. Two respective vicinities may be identical, partially overlapping or non-overlapping.

The mobile Bluetooth device 100 may e.g. be a hearing aid, another type of hearing device, or a hearing-aid streamer. The wireless communication system may thus form a hearing system, e.g. a binaural hearing system, or part hereof. Prior to communicating, the mobile Bluetooth device 100 needs to be paired with respectively the first Bluetooth terminal 210 and the second Bluetooth terminal 220. The mobile Bluetooth device 100 thus comprises a memory 10 and a controller 40 that is adapted to perform, initiate or engage in a Bluetooth pairing process as described further above with each of the first 210 and the second 220 Bluetooth terminals and thus to store the respective common link keys in the memory 10.

In a standard Bluetooth configuration, the common link key is overwritten when a device is paired with another device performing the same function as a previously paired device, and thus the bond with the previously paired device is lost. For instance, when a mobile phone is first paired with a first Bluetooth headset and subsequently with a second Bluetooth headset, the common link key shared between the mobile phone and the first Bluetooth headset is overwritten in the mobile phone with a new common link key shared between the mobile phone and the second Bluetooth headset. The mobile phone thus cannot reconnect to the first Bluetooth headset before a pairing process has been performed between the mobile phone and the first Bluetooth headset, thus forcing the user to interact manually. And then, the mobile phone cannot reconnect to the second Bluetooth headset before a pairing process has been performed between the mobile phone and the second Bluetooth headset, etc. To avoid this in the present wireless communication system, the controller 40 stores in the memory 10 copies of the respective common link keys and/or information, such as a pass code entered by the user, allowing the controller 40 to derive the respective common link keys such that the controller 40 may engage in a new pairing process with either of the first 210 and second 220 Bluetooth terminals and/or otherwise reconnect to them without any interaction from the user.

In addition, a controller 40 in at least one of the mobile Bluetooth device 100 and the first Bluetooth terminal 210 may store an identification, e.g. a MAC address, of the respective other device 100, 210 in a respective memory 10. The same applies mutatis mutandi to the second Bluetooth terminal 220.

The controller 40 also stores in the memory 10 the location 211, 221 and/or the vicinity 212, 222 of the respective Bluetooth terminal 210, 220 when performing the respective pairing process, i.e. during the pairing process or close before or after performing the pairing process. The locations 211, 221 and/or the vicinities 212, 222 are preferably stored in absolute coordinates.

The controller 40 may automatically determine the location 211, 221 and/or the vicinity 212, 222 of the respective Bluetooth terminal 210, 220, e.g. from the current device location 121 of the mobile Bluetooth device 100. In this case, the user is required to perform the pairing process with the mobile Bluetooth device 100 located close to the respective Bluetooth terminal 210, 220. Alternatively, the controller 40 may determine the location 211, 221 and/or the vicinity 212, 222 of the respective Bluetooth terminal 210, 220 from user input via a suitable user interface. As a further alternative, the location 211, 221 and/or the vicinity 212, 222 of the respective Bluetooth terminal 210, 220 may be stored in the respective Bluetooth terminal 210, 220 and transmitted to the controller 40 via the Bluetooth connection, when the pairing process is performed. The controller 40 may be adapted to perform a Bluetooth pairing process—including determination and/or storing of respective locations and/or vicinities—with further Bluetooth terminals in a similar way.

The mobile Bluetooth device 100 further comprises a comparator 20 that is adapted to determine a spatial relationship between the mobile Bluetooth device 100, the first Bluetooth terminal 210 and the second Bluetooth terminal 220 in dependence on at least one of the stored locations 211, 221 and vicinities 212, 222. The comparator 20 preferably determines the spatial relationship by determining whether the current device location 121 of the mobile Bluetooth device 100 lies, for example in terms of absolute coordinates, within the first vicinity 212 and/or within the second vicinity 222. The comparator 20 may alternatively determine the spatial relationship by determining the distance between the current device location 121 and the first location 211 and/or the second location 221, e.g. by direct computation from the absolute coordinates of the positions 121, 211, 221. To acquire the current device location 121 as an absolute device location in terms of absolute coordinates, the comparator 20 is adapted to engage with a locator unit 50, which may be e.g. a GPS unit of a smartphone carried by the user or be a corresponding unit integrated in the mobile Bluetooth device 100. The controller 40 may be adapted to handle further Bluetooth terminals in a similar way.

The mobile Bluetooth device 100 also comprises a selector 30 adapted to select from the first 210 and second 220 Bluetooth terminals a designated Bluetooth terminal such, that the first Bluetooth terminal 210 is selected as a designated Bluetooth terminal if the current device location 121 is within the first vicinity 212, and the second Bluetooth terminal 220 is selected as a designated Bluetooth terminal if the current device location 121 is within the second vicinity 222.

In the example shown in FIG. 1, the current device location 121 of the mobile Bluetooth device 110 is located within the first vicinity 212 Thus, the mobile Bluetooth device 100 is considered to be currently located at the workplace. In this case, the selector 30 selects the first Bluetooth terminal 210 as designated Bluetooth terminal. Alternatively, e.g. in the case that the current device location 121 lies within both vicinities 212, 222, the selector 30 may select the designated Bluetooth terminal as the one of the first 210 and second 220 Bluetooth terminals having the shortest distance to the current device location 121; the distances may be computed from the stored locations 211, 221 or in other ways as explained below in connection with FIG. 2. The selector 30 may be adapted to handle further Bluetooth terminals in a similar way.

The controller 40 may subsequently initiate a reconnection between the mobile Bluetooth device 100 and the designated Bluetooth terminal selected by the selector 30 using the respective link key stored during the respective pairing process, e.g. to provide a call signal to the hearing aid when a landline phone connected the selected Bluetooth terminal is ringing. Since in the example, the selector 30 selected the first Bluetooth terminal 210 as designated Bluetooth terminal, the controller 40 initiates a reconnection to this first Bluetooth terminal 210 using the link key stored during the pairing process with this first Bluetooth terminal 210. Since the controller 40 already knows the common link key for this first Bluetooth terminal 210, even in the case that it has performed the pairing process with the second Bluetooth terminal 220 after performing the pairing process with the first Bluetooth terminal 210, it can reconnect with the first Bluetooth terminal 210 without repeating the pairing process. The controller 40 may be adapted to handle further Bluetooth terminals in a similar way.

Figure 2:
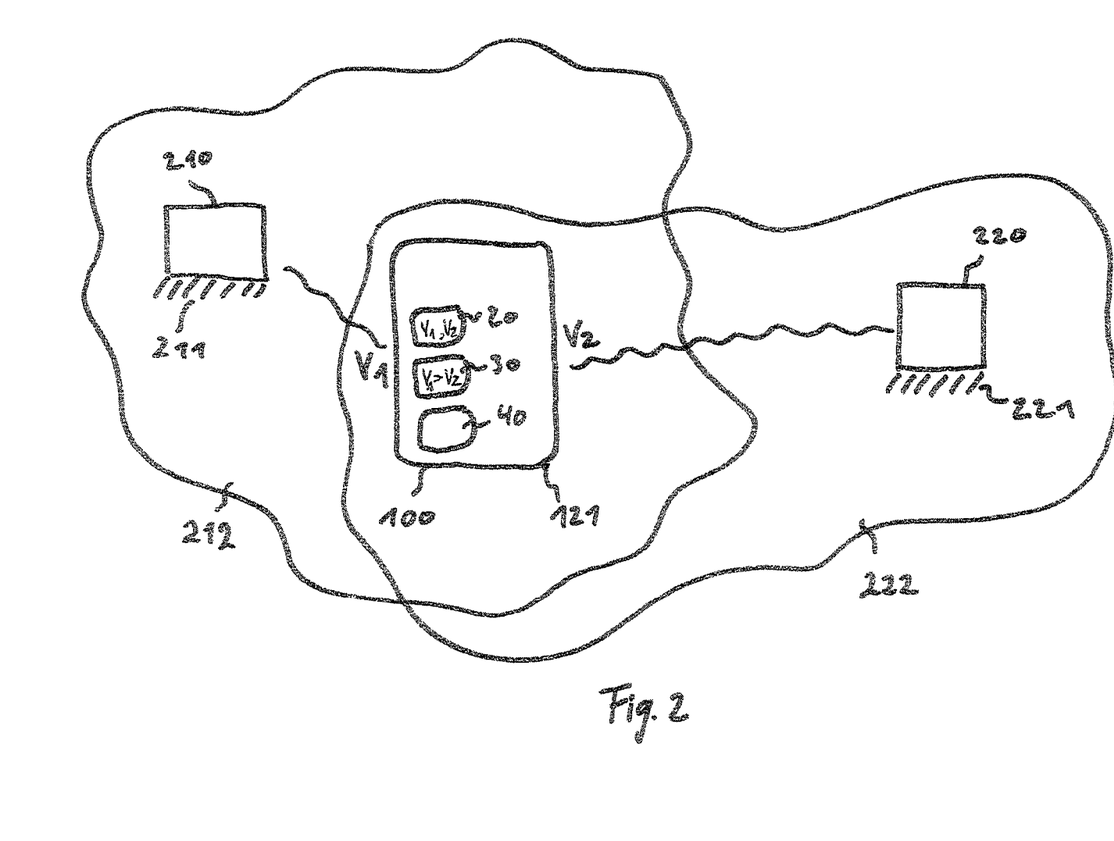

In the wireless communication system depicted in FIG. 2, a mobile Bluetooth device 100, which may be e.g. a hearing device, such as a hearing aid, or a hearing-aid streamer, is located at a current device location 121 (which is more or less identical to the current location of a user wearing the mobile Bluetooth device 100), a first Bluetooth terminal 210 is stationary located at first location 211, and a second Bluetooth terminal 220 is stationary located at second location 221. The first Bluetooth terminal 210, which may be provided as a first TV adapter in a first room at a user's home, is surrounded by a first vicinity 212. The first vicinity 212 is delimited by the Bluetooth range of the first Bluetooth terminal 210. The second Bluetooth terminal 220, which may be provided as a second TV adapter in a second room at a user's home, is surrounded by a second vicinity 222. The second vicinity 222 is delimited by the Bluetooth range of the second Bluetooth terminal 220. The first vicinity 212 and the second vicinity 222 partially overlap. This may be because the distance between the first Bluetooth terminal 210 located in the first room and the second Bluetooth terminal 220 located in the second room is smaller than the sum of the Bluetooth ranges of both Bluetooth terminals 210, 220.

The mobile Bluetooth device 100 is paired with respectively the first Bluetooth terminal 210 and the second Bluetooth terminal 220 as described above in connection with FIG. 1. However, instead of—or in addition to—storing a location 211, 221 and/or a vicinity 212, 222 of the respective Bluetooth terminal 210, 220, the controller 40 stores in the memory 10 a transmit power indication of the respective Bluetooth terminal 210, 220 when performing the respective pairing process. As explained further below, this allows the mobile Bluetooth device 100 to determine the distance—or at least an indication of the distance—to each of the Bluetooth terminals 210, 220 based on the strength of Bluetooth signals received from the respective Bluetooth terminal 210, 220. The controller 40 may determine the transmit power indication from the strength of Bluetooth signals received from the respective Bluetooth terminal 210, 220 when performing the pairing process, e.g. assuming a known distance to the respective Bluetooth terminal 210, 220, or the transmit power indication may be stored in the respective Bluetooth terminal 210, 220, which transmits it to the controller 40 via the Bluetooth connection when performing the pairing process.

The strength of a Bluetooth signal radiated from a Bluetooth terminal 210, 220 and determined at a current device location 121 of the mobile Bluetooth device 100 is a measure—at least an approximated measure—for a distance, the distance being a spatial relationship, between the mobile Bluetooth device 100 and a respective one of a number of Bluetooth terminals 210, 220 of the same class, i.e. having the same transmission power. To compensate for different transmission powers of the Bluetooth terminals 210, 220, the comparator 20 may weight the signal strength of the first Bluetooth terminal 210 with a value indicative of the transmission power of the first Bluetooth terminal 210 and weight the signal strength of the second Bluetooth terminal 220 with a value indicative of the transmission power of the second Bluetooth terminal 220. To further simplify a compensation for different transmission powers of the Bluetooth terminals 210, 220, the controller 40 may store in the memory 10 a Bluetooth class, e.g. class I, class II or class III, defining different maxima for transmission power, actual transmission power and/or another value indicative of a transmission power of a respective Bluetooth terminal 210, 220 when performing the pairing process.

In the example shown in FIG. 2, the mobile Bluetooth device 100, and consequently its current device location 121, is located both within the first vicinity 212 and within the second vicinity 222. Thus, the mobile Bluetooth device 100 is also located within the Bluetooth communication ranges of both the first 210 and the second 220 TV adapter.

The mobile Bluetooth device 100 comprises a comparator 20 adapted to determine a spatial relationship between the mobile Bluetooth device 100, the first Bluetooth terminal 210 and the second Bluetooth terminal 220. This is performed by the comparator 20 by determining a respective relative Bluetooth signal strength V1, V2 of each of the first 210 and second 220 Bluetooth terminals. The comparator 20 determines the relative Bluetooth signal strength V1 of the first Bluetooth terminal 210 by dividing the strength of a Bluetooth signal received from the first Bluetooth terminal 210 by the stored transmit power indication of the first Bluetooth terminal 210 and determines the relative Bluetooth signal strength V2 of the second Bluetooth terminal 220 by dividing the strength of a Bluetooth signal received from the second Bluetooth terminal 220 by the stored transmit power indication of the second Bluetooth terminal 220. Since the effects of possibly different transmit powers of the Bluetooth terminals 210, 220 are thus eliminated, the relative Bluetooth signal strengths V1, V2 indicate the distances to each of the first 210 and second 220 Bluetooth terminals.

The first value V1 is thus indicative of a spatial relationship, namely a distance, between the mobile Bluetooth device 100 and the first Bluetooth terminal 210, and the second value V2 is indicative of a spatial relationship, namely a distance, between the mobile Bluetooth device 100 and the second Bluetooth terminal 220. In the shown example, the first Bluetooth terminal 210 and the second Bluetooth terminal 220 are of the same Bluetooth class and thus have the same transmission power. Because the mobile Bluetooth terminal 100 is located closer to the first Bluetooth terminal 210 than to the second Bluetooth terminal 220, the signal strength of the first Bluetooth terminal 210 determined by the comparator 20 is larger than the signal strength of the second Bluetooth terminal 220 determined by the comparator 20. Consequently the first value V1 exceeds the second value V2.

The mobile Bluetooth device 100 furthermore comprises a selector 30 adapted to select the first Bluetooth terminal 210 as a designated Bluetooth terminal if the distance indicated by the second value V2 exceeds the distance indicated by the first value V1, and to select the second Bluetooth terminal 220 as the designated Bluetooth terminal if the distance indicated by the first value V1 exceeds the distance indicated by the second value V2. As in the example of FIG. 2 the distance indicated by the second value V2 exceeds the distance indicated by the first value V1, the selector 30 selects the first Bluetooth terminal 210 as the designated Bluetooth terminal.

The controller 40 is further adapted to initiate a reconnection between the mobile Bluetooth device 100 and the designated Bluetooth terminal selected by the selector 30 using the link key stored during the respective pairing process with the designated Bluetooth terminal. Since the selector 30 selected the first Bluetooth terminal 210 as designated Bluetooth terminal, the controller 40 initiates a reconnection to this first Bluetooth terminal 210 using the link key stored during the pairing process with the first Bluetooth terminal 210.

The features of the embodiments shown in FIG. 1 and FIG. 2 may be combined arbitrarily to obtain the explained benefits and/or to improve the reliability of determining the spatial relationships between the mobile Bluetooth device 100, the first Bluetooth terminal 210 and the second Bluetooth terminal 220.

Figure 3:
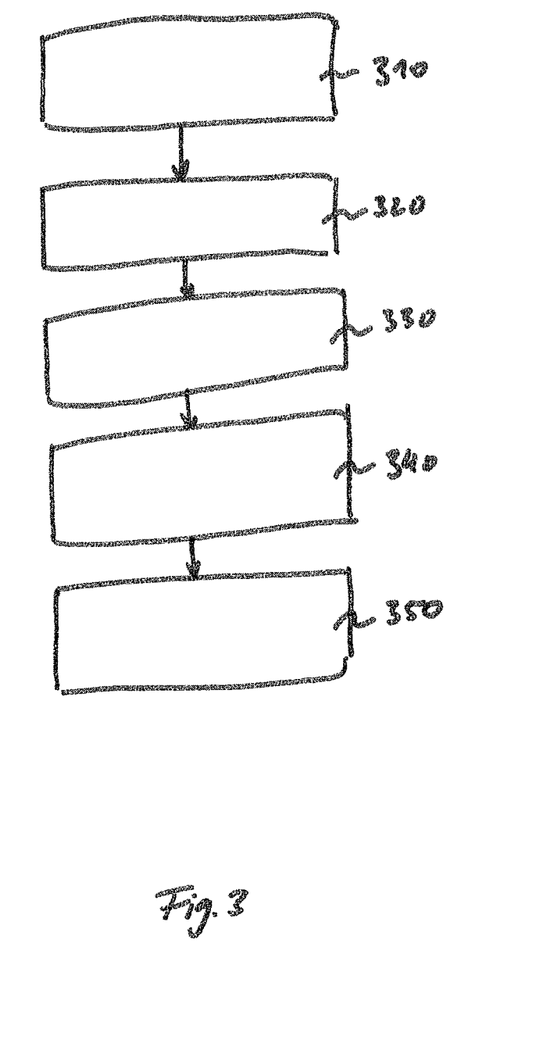

In a first step 310 in FIG. 3 a mobile Bluetooth device is paired with the first and second Bluetooth terminals using the Bluetooth pairing process described further above. Thus, a common link key and/or an identification of the respective other device is stored in a memory in at least one of the Bluetooth device and the first Bluetooth terminal. A further common link key and/or an identification of the respective other device is stored in a memory in at least one of the Bluetooth device and the second Bluetooth terminal. Furthermore, a respective location, a respective vicinity and/or a transmit power indication of the first and second Bluetooth terminals are stored in a memory comprised by the mobile Bluetooth device.

Before performing the following steps described below, the mobile Bluetooth terminal is in a state without any momentary communicative connection to any of the Bluetooth terminals it has been previously paired with.

In a second step 320 the mobile Bluetooth device acquires its current device location as an absolute device location, for example from a Smartphones' locator unit via the comparator comprised by the mobile Bluetooth device.

In a third step 330 a spatial relationship is determined by determining whether the current device location of the mobile Bluetooth device lies within a first vicinity of the first location and/or within a second vicinity of the second location stored in the memory of the mobile Bluetooth device.

In a fourth step 340 from the first and second Bluetooth terminals a designated Bluetooth terminal is selected such that the first Bluetooth terminal is selected as a designated Bluetooth terminal if the current device location of the mobile Bluetooth device is within the first vicinity, and the second Bluetooth terminal is selected as a designated Bluetooth terminal if the current device location of the mobile Bluetooth device is within the second vicinity.

In a fifth step 350 a reconnection between the mobile Bluetooth device and the designated Bluetooth terminal selected in the fourth step 340 is initiated. The reconnection is made using the common link key stored in step 310 when pairing the mobile Bluetooth device with the designated Bluetooth terminal selected in the fourth step 340. This is possible because each of the devices has the same link key stored in their respective memory.

Figure 4:
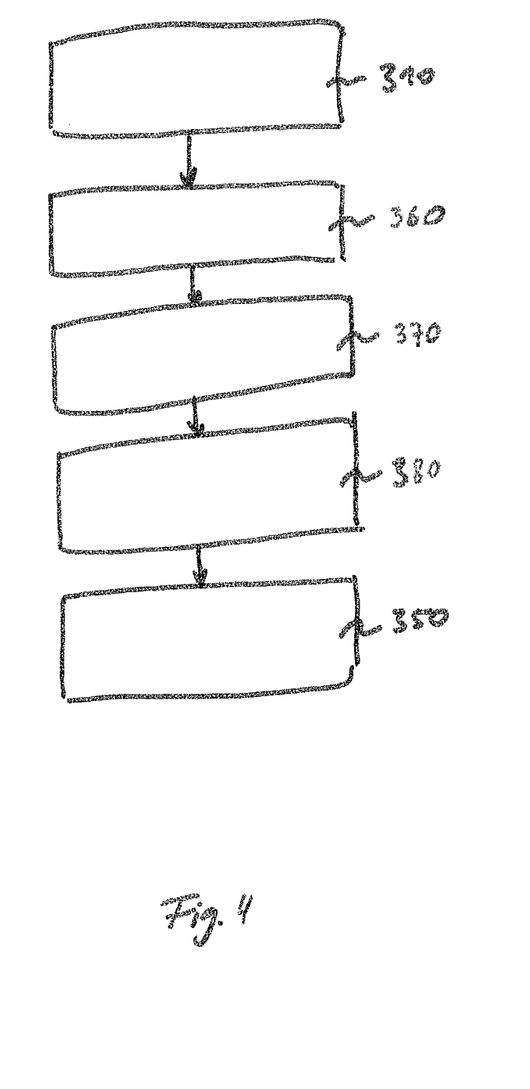

In a first step 310 in FIG. 4 a mobile Bluetooth device is paired with the first and second Bluetooth terminals using the Bluetooth pairing process described further above. Thus, a common link key and/or an identification of the respective other device is stored in a memory in at least one of the Bluetooth device and the first Bluetooth terminal. A further common link key and/or an identification of the respective other device is stored in a memory in at least one of the Bluetooth device and the second Bluetooth terminal. Furthermore, a respective location, a respective vicinity and/or a transmit power indication of the first and second Bluetooth terminals are stored in a memory comprised by the mobile Bluetooth device.

In a second step 360 a relative signal strength of the first and second Bluetooth terminals is determined by the comparator comprised by the mobile Bluetooth device using the stored transmit power indications, e.g. as described further above.

In a third step 370 a first value indicative of a spatial relationship between the current device location of the mobile Bluetooth device and the first location is set to be the relative signal strength of the first Bluetooth terminal. Furthermore a second value indicative of a spatial relationship between the current device location and the second location is set to be the relative signal strength of the second Bluetooth terminal.

In a fourth step 380 the first Bluetooth terminal is selected as a designated Bluetooth terminal if the distance indicated by the second value exceeds the distance indicated by the first value and the second Bluetooth terminal is selected as the designated Bluetooth terminal if the distance indicated by the first value exceeds the distance indicated by the second value.

In a fifth step 350 a reconnection between the mobile Bluetooth device and the designated Bluetooth terminal selected in the fourth step 340 is initiated. The reconnection is made using the common link key stored in step 310 when pairing the mobile Bluetooth device with the designated Bluetooth terminal selected in the fourth step 340. This is possible because each of the devices has the same link key stored in their respective memory.

The steps described with respect to FIG. 4 may be performed consecutively to the steps described with respect to FIG. 3—or interleaved therewith as described further above in connection with FIGS. 1 and 2—to form further embodiments of the invention.

A particular advantage of embodiments of the present invention is that a user does not need to manually interact when moving between locations each having a Bluetooth terminal performing a function that is needed in that particular location and not in the respective other locations, even when the functions are similar and in a standard Bluetooth system would conflict with each other and require repeated pairing of the devices. As an example, a hearing aid user may have a Bluetooth connection between one or both of his hearing aids and a TV-adapter acting as a Bluetooth terminal as described above. The TV adapter provides wireless transmission of the audio signal from a TV set connected thereto to the hearing aid(s). When the user moves to another room having a similar set-up, the hearing aid acting as a Bluetooth device as described above may automatically disconnect from the TV adapter in the first room and connect to the TV adapter in the other room without the user having to interact manually. All that is required from the user, is that he initially performs the pairing between the hearing aid and each of the TV adapters when the hearing aid is located close to the respective TV adapter, or that he enters information about the respective locations, vicinities and/or transmit powers via a suitable user interface, e.g. on a streamer connected to the hearing aid(s).

In some embodiments, the common link key—or a pass code—may be pre-stored in the respective Bluetooth terminals 210, 220, and the common link key or a pass code may be entered manually into the mobile Bluetooth device 100. Alternatively, the common link key or a pass code may be entered manually in both devices 100, 210, 220 via respective user interfaces. This is part of pairing processes that are well known from the Bluetooth standard and various implementations hereof.

In some embodiments, the selector 30 may also be adapted to unselect the first Bluetooth terminal 210 from the status as designated Bluetooth terminal if the conditions mentioned further above for selecting the first Bluetooth terminal 210 as designated Bluetooth terminal are not met. The same applies with respect to the second Bluetooth terminal 220. This is especially suitable if the mobile Bluetooth device 100 is to be connected to one of a large number of Bluetooth terminals, the Bluetooth terminals having vicinities of different spread and/or vicinities overlapping.

The teachings of the present invention may be applied to systems comprising more than two Bluetooth terminals 210, 220, e.g. three, four, five or even more Bluetooth terminals.

Features explained in the context of different embodiments may be combined with each other to form further embodiments, as long as they are not explicitly described as forming mutually exclusive alternatives to each other. It will be understood that embodiments of methods according to the invention share the corresponding advantages of corresponding embodiments of systems according to the invention.

The invention may be implemented at least partly in software, and a computer program for operating a mobile Bluetooth device may thus comprise program code means for causing the mobile Bluetooth device to carry out any of the disclosed methods according to the invention.

The invention may be implemented in systems and/or methods using other communication standards than Bluetooth, provided such systems and/or methods allow the use of secured connections, which require pairing of participating devices before they may communicate via the secured connections.

The invention claimed is:

1. A wireless hearing aid system, comprising:
a hearing aid being a mobile Bluetooth master device;
a first Bluetooth terminal being a first slave device; and
a second Bluetooth terminal being a second slave device, wherein
the hearing aid includes
   a memory, and
   a controller adapted to engage in a first pairing process with the first Bluetooth terminal as a result of which identical first link keys are stored in the memory of the hearing aid and in the first Bluetooth terminal,
   the controller further being adapted to engage in a second pairing process with the second Bluetooth terminal as a result of which identical second link keys are stored in the memory of the hearing aid and in the second Bluetooth terminal,
   the controller further is adapted to store in the memory, a first vicinity delimited by first predetermined coordinates of the first Bluetooth terminal when performing the first pairing process and to store in the memory a second vicinity delimited by second predetermined coordinates of the second Bluetooth terminal when performing the second pairing process,
the hearing aid further includes a comparator adapted
   to determine a current device location of the hearing aid,
   to measure a distance from the current device location to the first vicinity and the second vicinity, and
   to determine whether the mobile Bluetooth device is in the first vicinity or in the second vicinity in dependence on at least one of the stored first vicinity and the stored second vicinity,
the hearing aid further includes a selector adapted to select from the first and second Bluetooth terminals a designated Bluetooth terminal by evaluating the determination of the vicinity in which the hearing aid is located, and
the controller further is adapted to initiate a reconnection between the hearing aid and the designated Bluetooth terminal using the respective first or second link key stored in the memory during the respective first or second pairing process with the designated Bluetooth terminal in response to the comparator determining that the hearing aid changed its location from the vicinity of one of the first and second Bluetooth terminals to the vicinity of the other of the first and second Bluetooth terminals.

2. The wireless hearing aid system according to claim 1, wherein the comparator is adapted to determine a first value indicative of a distance between the hearing aid and the first Bluetooth terminal and to determine a second value indicative of a distance between the hearing aid and the second Bluetooth terminal, and wherein the selector is adapted to select the first Bluetooth terminal as the designated Bluetooth terminal if the distance indicated by the second value exceeds the distance indicated by the first value and to select the second Bluetooth terminal as the designated Bluetooth terminal if the distance indicated by the first value exceeds the distance indicated by the second value.

3. The wireless hearing aid system according to claim 2, wherein the comparator is adapted to determine a current device location of the hearing aid and to determine the first value by determining the distance between the current device location and the stored first location and to determine the second value by determining the distance between the current device location and the stored second location.

4. The wireless hearing aid system according to claim 1, wherein the comparator is adapted to engage with a locator unit to acquire the current device location of the hearing aid as an absolute device location.

5. The wireless hearing aid system according to claim 2, wherein the comparator is adapted to determine a first Bluetooth signal strength of the first Bluetooth terminal, to determine the first value in dependence on the first Bluetooth signal strength and the stored first transmit power indication, to determine a second Bluetooth signal strength of the second Bluetooth terminal, and to determine the second value in dependence on the second Bluetooth signal strength and the stored second transmit power indication.

6. The wireless hearing aid system according to claim 1, wherein
the controller is configured to initiate the reconnection without user interaction.

7. The wireless hearing aid system according to claim 4, wherein
the locator unit is a GPS unit and/or a cell phone locator unit.

8. A method for engaging a hearing aid being a master device in a wireless Bluetooth connection to a first Bluetooth terminal being a first slave device and/or to a second Bluetooth terminal being a second slave device, the method comprising:
   performing a first pairing process between the hearing aid and the first Bluetooth terminal, thereby storing identical first link keys in the hearing aid and in the first Bluetooth terminal;
   when performing the first pairing process, storing in a memory comprised by the hearing aid a first vicinity delimited by first predetermined coordinates of the first Bluetooth terminal;
   performing a second pairing process between the hearing aid and the second Bluetooth terminal, thereby storing identical second link keys in the hearing aid and in the second Bluetooth terminal;
   when performing the second pairing process, storing in the memory a second vicinity delimited by second predetermined coordinates of the second Bluetooth terminal;
   determining a current device location of the hearing aid;
   measuring a distance from the current device location to the first vicinity and the second vicinity;
   determining whether the hearing aid is in the first vicinity or in the second vicinity in dependence on at least one of the stored first vicinity and the stored second vicinity;
   selecting from the first and second Bluetooth terminals a designated Bluetooth terminal by evaluating the determined vicinity in which the hearing aid is located; and
   initiating a reconnection between the hearing aid and the designated Bluetooth terminal using the respective first or second link key stored during the respective first or second pairing process with the designated Bluetooth terminal in response to the determining that the hearing aid changed its location from the vicinity of one of the first and second Bluetooth terminals to the vicinity of the other of the first and second Bluetooth terminals.

9. The method according to claim 8, further comprising:
   determining a first value indicative of a distance between the hearing aid and the first Bluetooth terminal;

determining a second value indicative of a distance between the mobile Bluetooth device hearing aid and the second Bluetooth terminal;

selecting the first Bluetooth terminal as the designated Bluetooth terminal if the distance indicated by the second value exceeds the distance indicated by the first value; and selecting the second Bluetooth terminal as the designated Bluetooth terminal if the distance indicated by the first value exceeds the distance indicated by the second value.

10. The method according to claim 9, further comprising:

determining a current device location of the hearing aid;

determining the first value by determining the distance between the current device location and the stored first location; and determining the second value by determining the distance between the current device location and the stored second location.

11. The method according to claim 8, further comprising:

acquiring the current device location of the hearing aid as an absolute device location from a locator unit.

12. The method according to claim 9, further comprising:

determining a first Bluetooth signal strength of the first Bluetooth terminal;

determining the first value in dependence on the first Bluetooth signal strength and the stored first transmit power indication;

determining a second Bluetooth signal strength of the second Bluetooth terminal; and determining the second value in dependence on the second Bluetooth signal strength and the stored second transmit power indication.

13. The method according to claim 8, wherein the initiating the reconnection between the hearing aid and the designated Bluetooth terminal takes place without user interaction.

* * * * *